(12) United States Patent
Cao et al.

(10) Patent No.: US 12,713,330 B2
(45) Date of Patent: Aug. 18, 2026

(54) SYSTEM INFORMATION ADAPTATION FOR NON-TERRESTRIAL NETWORKS

(71) Applicant: ZTE Corporation, Shenzhen (CN)

(72) Inventors: Wei Cao, Shenzhen (CN); Nan Zhang, Shenzhen (CN); Chenchen Zhang, Shenzhen (CN); Jianqiang Dai, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 368 days.

(21) Appl. No.: 18/351,981

(22) Filed: Jul. 13, 2023

(65) Prior Publication Data

US 2023/0362793 A1 Nov. 9, 2023

Related U.S. Application Data

(63) Continuation of application No. PCT/CN2021/072193, filed on Jan. 15, 2021.

(51) Int. Cl.
*H04W 48/08* (2009.01)
*H04B 7/185* (2006.01)

(52) U.S. Cl.
CPC ........ *H04W 48/08* (2013.01); *H04B 7/18513* (2013.01)

(58) Field of Classification Search
CPC .......................... H04B 7/18513; H04W 48/08
USPC .......................................................... 455/427
See application file for complete search history.

(56) References Cited

U.S. PATENT DOCUMENTS

2014/0348116 A1* 11/2014 Yamada ................ H04W 28/12 370/329
2016/0037556 A1* 2/2016 Kim .................... H04W 74/006 370/336
2016/0192323 A1* 6/2016 Kim .................. H04W 52/0216 455/458
2021/0297147 A1* 9/2021 Qaise ................ H04B 7/18539

FOREIGN PATENT DOCUMENTS

CN 109155965 A 1/2019
CN 111526576 A 8/2020
JP 2014-135596 A 7/2014
WO 2000/048414 A1 2/1999
WO 2019/196933 A1 10/2019
WO 2020192788 A1 10/2020

OTHER PUBLICATIONS

First Examination Report for Indian Patent Application No. 202317046033, mailed Jan. 21, 2025 (6 pages).

(Continued)

*Primary Examiner* — Fabricio R Murillo Garcia
(74) *Attorney, Agent, or Firm* — Perkins Coie LLP

(57) ABSTRACT

This patent document describes, among other things, techniques, and apparatuses for providing non-terrestrial network connectivity to improve wireless network efficiency and performance. In one aspect, a method of wireless communication is disclosed. The method includes transmitting, from a network node to a user device, a block of system information that includes system information that is time varying due to at least one of movement of the network node or movement of the user device.

12 Claims, 4 Drawing Sheets

(56) References Cited

OTHER PUBLICATIONS

International Search Report and Written Opinion for International Patent Application No. PCT/CN2021/072193, mailed Sep. 28, 2021 (10 pages).
Samsung, "RACH Aspects for an NTN—Observations and Proposals," 3GPP TSG RAN WG2 Meeting #112, R2-2008911, e-Meeting, Nov. 2-13, 2020 (10 pages).
ZTE, "Performance evaluation on the DL synchronization in NTN," 3GPP TSG RAN WG1 #97, R1-1906874, Reno, USA, May 13-17, 2019 (4 pages).
CMCC, "Discussion on timing relationship enhancements for NTN," 3GPP TSG RAN WG1 #103-e, R1-2008010, e-Meeting, Oct. 26-Nov. 13, 2020 (6 pages).
Huawei et al., "Discussion on UL time and frequency synchronization enhancement for NTN," 3GPP TSG RAN WG1 Meeting #102-e, R1-2005266, E-meeting, Aug. 17-28, 2020 (8 pages).
Office Action for Japanese Patent Application No. 2023-542544, mailed Jul. 5, 2024, with English summary (7 pages).
Thales, "Email discussion summary for [97e][232] NR_NTN_solutions_RRM," 3GPP TSG-RAN WG4 Meeting# 97-e, R4-2017302 (revision of R4-2017031), Electronic Meeting, Nov. 2-Nov. 13, 2020 (90 pages).
Extended European Search Report for European Patent Application No. 21918566.7, mailed Aug. 23, 2024 (9 pages).
Thales et al., "On Doppler shift compensation and Timing Advance in NTN," 3GPP TSG RAN WG1 Meeting #97, R1-1907390, Reno, USA, May 13-May 17, 2019 (31 pages).
Communication pursuant to Article 94(3) EPC for European Patent Application No. 21918566.7, mailed Sep. 1, 2025 (4 pages).
Office Action for Korean Patent Application No. 10-2023-7023355, mailed Oct. 31, 2025, with English summary (7 pages).
Hearing Notice for Indian Patent Application No. 202317046033, issued on May 4, 2026 (2 pages).

* cited by examiner

Figure 2:
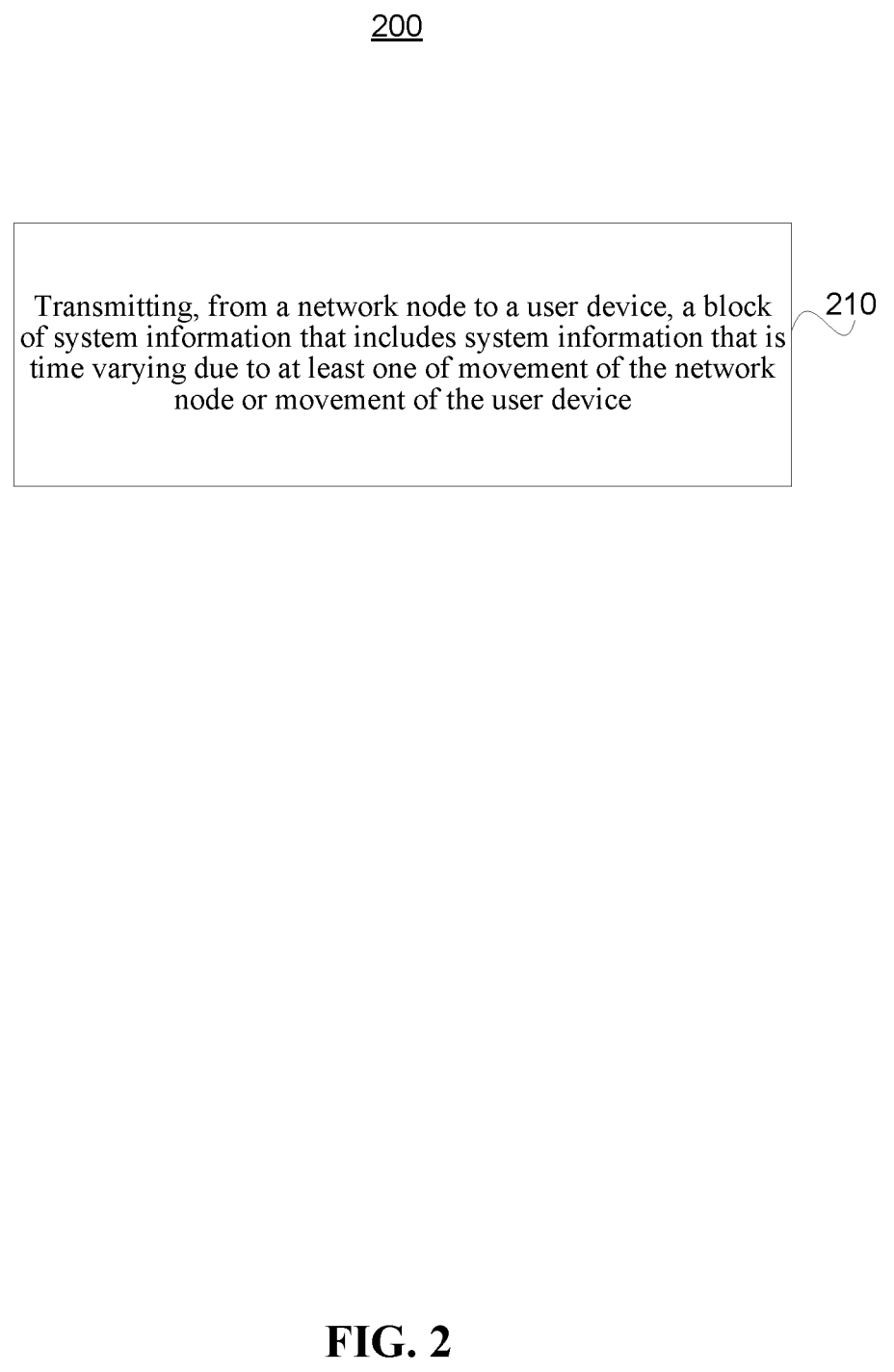

200

Transmitting, from a network node to a user device, a block of system information that includes system information that is time varying due to at least one of movement of the network node or movement of the user device

Figure 3:
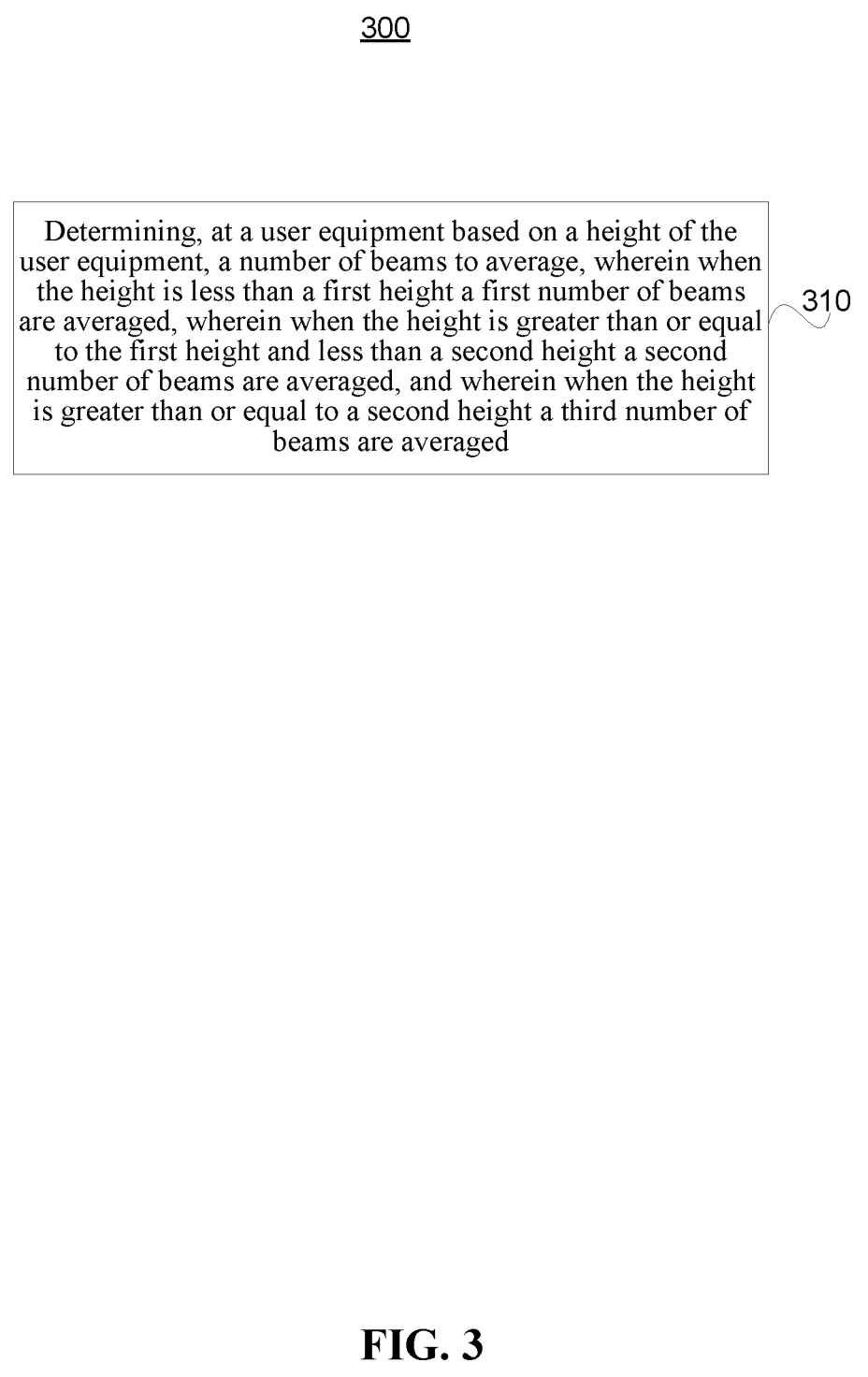

Determining, at a user equipment based on a height of the user equipment, a number of beams to average, wherein when the height is less than a first height a first number of beams are averaged, wherein when the height is greater than or equal to the first height and less than a second height a second number of beams are averaged, and wherein when the height is greater than or equal to a second height a third number of beams are averaged

SYSTEM INFORMATION ADAPTATION FOR NON-TERRESTRIAL NETWORKS

CROSS REFERENCE TO RELATED APPLICATIONS

This patent document is a continuation of and claims benefit of priority to International Patent Application No. PCT/CN2021/072193, filed on Jan. 15, 2021. The entire content of the before-mentioned patent application is incorporated by reference as part of the disclosure of this application.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. This demand has expanded to data connectivity to airborne platforms. Aspects, such as energy consumption, device cost, spectral efficiency, and latency are also important to meeting the needs of various communication scenarios. Various techniques, including new ways to provide higher quality of service including service on airborne platforms and service provided by airborne platforms are being discussed.

SUMMARY

This patent document describes, among other things, techniques, and apparatuses for providing non-terrestrial network connectivity to improve wireless network efficiency and performance.

In one aspect, a method of wireless communication is disclosed. The method includes transmitting, from a network node to a user device, a block of system information that includes system information that is time varying due to at least one of movement of the network node or movement of the user device.

In another aspect, another method for wireless communications is disclosed. The method includes determining, at a user equipment based on a height of the user equipment, a number of beams to average, wherein when the height is less than a first height a first number of beams are averaged, wherein when the height is greater than or equal to the first height and less than a second height a second number of beams are averaged, and wherein when the height is greater than or equal to a second height a third number of beams are averaged.

In another aspect, a wireless communication apparatus comprising a processor configured to implement a method described herein is disclosed.

In another aspect, computer readable medium including executable instructions to implement a method described herein is disclosed.

These, and other, aspects are described in the present document.

BRIEF DESCRIPTION OF DRAWINGS

FIG. 2 shows an example of a process, in accordance with some example embodiments.

FIG. 3 shows another example of a process, in accordance with some example embodiments.

DETAILED DESCRIPTION

Figure 1:
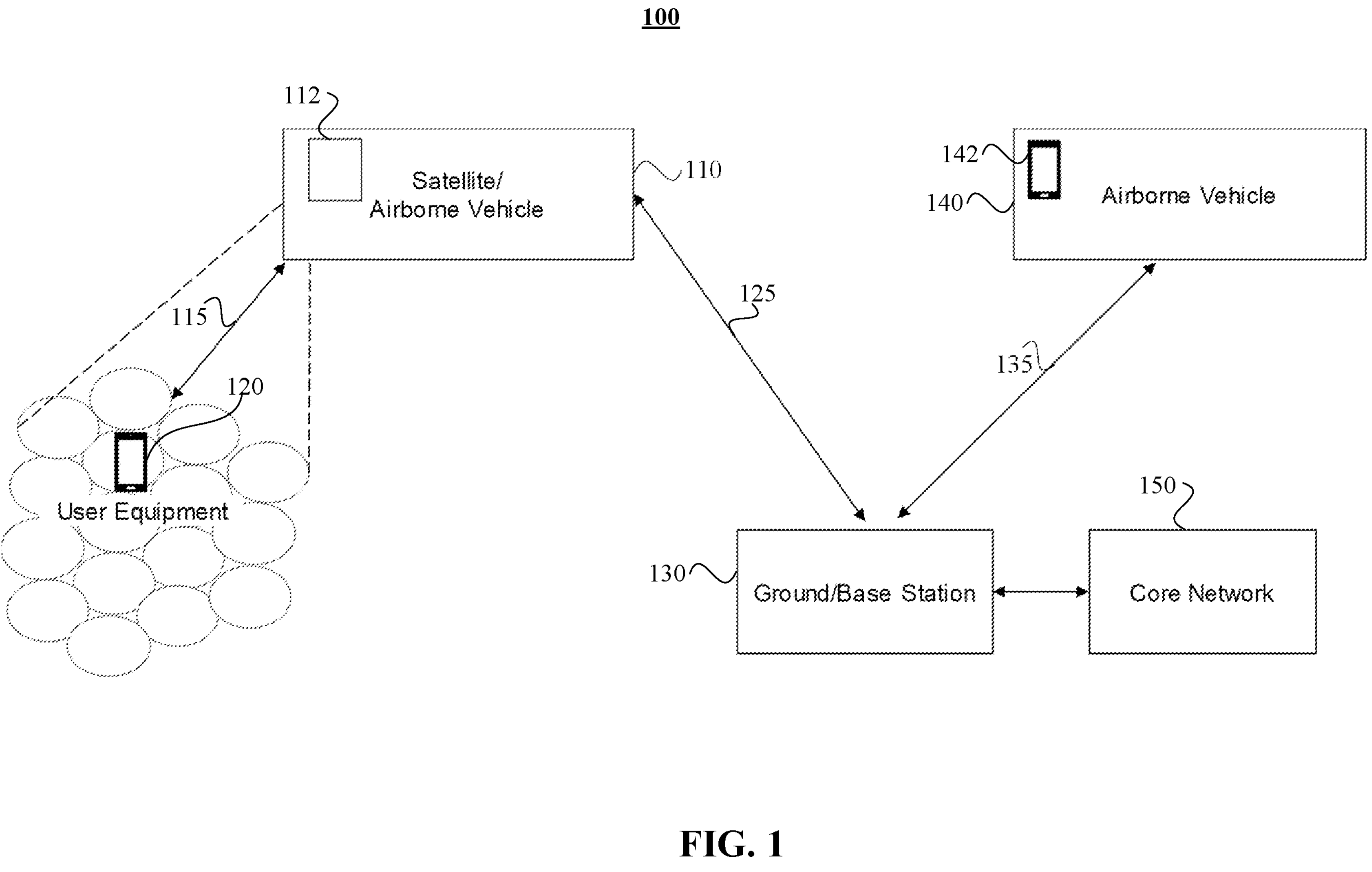
FIG. 1 shows an example of a wireless communication system in which one or more embodiments of the present technology can be applied.

Certain features are described using the example of Fifth Generation (5G) wireless protocol. However, applicability of the disclosed techniques is not limited to only 5G wireless systems. The following description includes section headings for organization and to enhance clarity without limiting various combinations of the features under the various headings.

Many cellular network operators have both mobile network and fixed network operations. Many operators provide service combining mobile communication, fixed telephony, and broadband Internet, and some providers television service as well. Operators can distinguish themselves by providing an optimal integration between the different services. Following the trend of expanded service scenarios, operators are looking to support airborne user equipment (UEs) as well as providing service from airborne base stations.

Connectivity via satellites and/or airborne vehicles is a promising technology to expand the utilization of the fifth-generation (5G) new radio (NR) and long-term evolution (LTE) system access technologies. A network incorporating satellites and/or airborne vehicles to perform the functions (either full or partial) of terrestrial base stations (BSs) may be referred to as a non-terrestrial network (NTN). NTN's also include UEs that are airborne being served by satellites and/or airborne base stations.

In NTNs, time-variant Doppler and propagation delay of signals may be caused by various factors including: (1) satellite or airborne based base station (BS) moving with a high speed along its orbit while serving UEs on the ground, and (2) airborne UEs moving at a high speed being served by a ground based BS. To combat the impact of Doppler and propagation delay in uplink (UL) transmissions, UEs can use system information (SI) to facilitate efficient transmission, reception, measurement, and monitoring. However, the modification and update period of SI in current approaches for terrestrial networks is too long for NTN networks. For example, in 5G technology, the modification period of SIs is 40960 ms for narrow band Internet of things (NB-IoT). As such, SI information is fixed during a 40.9 second interval. In contrast, the serving time of a low-earth orbit (LEO) satellite for a given area on the ground may be shorter than 40.9 second. In this example, SI from the current systems would not update the SI information for the entire time the LEO is serving the area. This example shows that a shorter modification period of SI is needed for NTN scenarios.

In another aspect, NTNs can support airborne UEs with a ground based BS. UEs moving on airborne vehicles will require handover during their flight. Measurements at the UE should be simplified to reduce both the power consumption and the time delay. For example, the BS in an air-to-ground (ATG) communication network may use multiple beams to cover different height ranges for airplanes. A height is an elevation or an altitude of an airborne UE or base station. An airborne UE may detect multiple beams during taxiing/taking off/landing, while it may detect only one beam during flight. A drone UE is similar, where the drone UE may detect a different number of beams at different heights. To reduce signaling cost, adaptive measurement re-configuration can be used in these scenarios.

Disclosed are (1) SI and a corresponding modification period suitable for airborne BSs and UEs, and (2) adaptive measurement re-configuration to speed handover.

FIG. 1 shows an example NTN system 100 where techniques in accordance with one or more embodiments of the present technology can be applied. A satellite/airborne vehicle 110 carries an airborne base station 112 that communicates wirelessly via communications link 115 with UE 120 on the ground in a particular cell. Airborne base station 112 may serve multiple cells on the ground using different antenna beams and/or steerable antenna beams. satellite/airborne vehicle 110 connects to ground based ground/base station 130 or an airborne gateway (not shown). The ground/base station provides data connectivity to core network 150. Ground/base station 130 also communicates with airborne UE 142 over communications link 135. Airborne UE 142 is carried on airborne vehicle 140 such as a manned aircraft, unmanned aerial vehicle (UAV), drone, balloon, or other air vehicle.

The core network 150 can communicate with one or more base stations 130. The core network 150 provides connectivity with other wireless communication systems and wired communication systems. The core network may include one or more service subscription databases to store information related to the subscribed wireless devices 120 and 142. A first base station 112 can provide wireless service based on a first radio access technology, whereas a second base station 130 can provide wireless service based on a second radio access technology. The wireless devices 120 and 142 can support multiple different radio access technologies. The techniques and embodiments described in the present document may be implemented by the base stations described in the present document or by wireless devices.

Current System Information and Corresponding Modification Period

System information can include one or more of a master information block (MIB), system information block 1 (SIB1), SIBx, and other information. MIB provides significant information, SIB1 provides essential information to access the system and contains scheduling information of SIB. SIBx contains other necessary information.

In current systems, a change of system information only occurs at specific radio frames which reflects a modification period. The modification period boundaries are defined by system frame number (SFN) values for which SFN mod m=0, where m is the number of radio frames in the modification period. The modification period is configured by system information, which can be expressed in number of radio frames=modificationPeriodCoeff*defaultPagingCycle with range of 640~163840 ms. The modification period of all SIs is typically the same.

As an illustrative example, in a typical low earth orbit (LEO) satellite communication system with an orbit height of 600 km, the maximum Doppler shift variant rate is 0.27 ppm/second. In this example, the Doppler shift change may be up to 44.2 ppm (=0.27*163840/1000) in the SI modification period. If necessary, assistant information broadcast in the SI does not change during the SI modification period, the UE will have difficulty reliably accessing the network.

In one aspect, system information specific to NTNs needs a timely update. In some example embodiments, only system information specific to NTNs is updated with a shorter modification period. In other embodiments, all system information may be updated with the shorter modification period.

Current Measurement Configuration

In 5G systems, the network may configure the UE in RRC_CONNECTED to derive reference signal received power (RSRP), reference signal received quality (RSRQ) and signal to interference and noise ratio (SINR) measurement results per cell associated to NR measurement objects based on parameters configured in the measObject (e.g. maximum number of beams to be averaged and beam consolidation thresholds) and in the reportConfig (rsType to be measured, SS/PBCH block or CSI-RS). The network may configure the UE in RRC_IDLE or in RRC_INACTIVE to derive RSRP and RSRQ measurement results per cell associated to NR carriers based on parameters configured in measIdleCarrierListNR within VarMeasIdleConfig for measurements performed.

The measurement configuration described above is informed to the UE by the RRC message RRCReconfiguration or RRCResume. With the configuration, per cell measurement quantity can be derived using per beam measurement quantity using best beam measurement or averaged beam measurements. For UEs on airborne vehicles, the UEs cannot change their measurement configuration without a message such as the RRC messages described above.

Example System Information and Corresponding Modification Period

Extra system information is needed in NTNs, and some of the system information should be updated in a timely manner. The extra system information that should be informed to UEs in a timely manner is listed below.

1. position/velocity/time (PVT) of the BS: With the movement of the BS, PVT information is needed for the UE to calculate a pre-compensation value to be applied in an UL transmission.

2. scheduling delay (k_offset): With the movement of the BS, the propagation delay between the BS and UE changes over time. A time-variant k_offset is needed to improve scheduling efficiency.

3. common timing advance (TA_common): For a given beam, a common propagation delay can be indicated, which can be the minimum/intermediate/maximum value of the propagation delay for the given beam. This parameter aids efficient scheduling.

4. timing drift rate (R_drift): With the movement of the BS, the propagation delay between the BS and the UE changes, which can be reflected by a timing drifting rate.

New SIBx

Anew SIBx can be defined to carry the NTN specific SI listed above. A UE first checks the network type to see whether it is necessary to monitor the SIBx. Using NB-IoT as an example, the network type can be indicated in SIB1-NB using a PLMN ID. The current PLMN ID has the following entries in SIB1: PLMN ID=MCC (country, 3 digits)+MNC (network 2~3 digits), and NTN network type can be indicated by MNC. The modification of SIBx has following options.

1. The new SIBx can be configured with a pre-defined modification period. UEs read the new SIBx with the pre-defined modification period to obtain timely updates. The modification period boundaries are defined by SFN values for which SFN mod m_SIBx=0, where m_SIBx is the number of radio frames including the modification period of SIBx. The modification period of SIBx is configured by system information or pre-defined and has value/range that can be different from the modification period of existing SIs.

2. The new SIBx can use the same modification period of existing SIs, with corresponding valueTag indication added in SIB1. This case applies for some NTNs with a stationary BS (for example, a geosynchronous equatorial orbit (GEO) satellite or semi-fixed floating platform-based network), when the existing modification period meets the NTN application requirements.

3. The new SIBx can be modified aperiodically with corresponding indication in short message. NTN UEs in RRC_IDLE or in RRC_INACTIVE shall monitor for indications about SIBx change indication in its own paging occasion every DRX cycle. NTN UEs in RRC_CONNECTED monitor for SIBx change indication in any paging occasion at least once every defaultPagingCycle if the UE is provided with common search space to monitor paging. A separate bit (or bits) can be added in the short message to indicate the change of the new SIBx.

Adaptive Modification Periods for PVT of an Airborne Base Station with Relatively Stable Speed and a Fixed Trajectory PVT for a BS is for that particular airborne BS. So, the PVT is a common SI shared by multiple beams (if applicable) of the airborne BS.

In a typical LEO system, the ephemeris is broadcast with a period on the order of 1 second. Since the speed of a satellite is generally fixed and is determined by its orbit height, the modification period of PVT can be pre-defined to match the satellite's orbit height range. The modification period boundaries are defined by SFN values for which SFN mod m_SIBx=0, where m_SIBx is the number of radio frames in the modification period of SIBx. The SIBx carrying PVT may be transmitted a number of times with the same content within a modification period, as defined by its scheduling. The modification period is pre-defined based on orbit height range as detailed below:

| Height range (h) | Modification period (m_SIBx) |
|---|---|
| H1 ≤ h < H2 | m_SIBx_1 |
| H2 ≤ h < H3 | m_SIBx_2 |
| H3 ≤ h < H4 | m_SIBx_3 |

Adaptive Modification Periods for PVT of an Airborne Base Station with Time-Variant Speed and Flexible Trajectory In an NTN system with drone/balloon based BS, the speed and trajectory may change according to a deployment requirement. Therefore, for the airborne BS with time-variant speed and flexible trajectory, the modification period can be pre-defined based on the moving speed range of the air-borne BS. The modification period boundaries are defined by SFN values for which SFN mod m_SIBx=0, where m_SIBx is the number of radio frames in the modification period of SIBx. The SIBx carrying PVT may be transmitted a number of times with the same content within a modification period, as defined by its scheduling. The modification period is pre-defined based on moving speed range as illustrated below:

| Moving speed range (v) | Modification period (m_SIBx) |
|---|---|
| V1 ≤ v < V2 | m_SIBx_1 |
| V2 ≤ v < V3 | m_SIBx_2 |
| V3 ≤ v < V4 | m_SIBx_3 |

Adaptive Measurement Re-Configuration on Cell Measurement Results Calculation

For each cell measurement quantity to be derived at the UE, a pre-defined number of beams to average based on the height of an airborne vehicle UE is illustrated below.

| Height range (h) | Number of beams to average (n_beam) |
|---|---|
| h < H1 | n_beam_1 |
| H1 ≤ h < H2 | n_beam_2 |
| H2 ≤ h | n_beam_3 (or can be omitted as not configured) |

The UE uses the pre-defined n_beam_x corresponding to the UE's height.

If n_beam_x is not configured (e.g., H2≤h), or if the highest beam measurement quantity value is below or equal to a pre-defined threshold, the UE derives each cell measurement quantity based on the configured beam measurement resource as the highest beam measurement quantity value. The configured beam measurement resource can be SSB or CSI-RS.

If n_beam_x is configured, and if the highest beam measurement quantity value is above a pre-defined threshold, the UE derives each cell measurement quantity based on the configured beam measurement resource as the linear power scale average of the highest beam measurement quantity values above the pre-defined threshold where the total number of averaged beams shall not exceed n_beam_x.

Adaptive Measurement Re-Configuration on Measurement Reporting

If the reporting of the beam measurement is configured, the beam measurement resource index (e.g., SSB index, CSI-RS index) whose measurement quantity is above the pre-defined threshold is included in the measurement report with sorting based on per beam measurement quantity. At most n_beam_x beam measurement resource indexes are included in the measurement report. If less than n_beam_x measurement quantity is above the pre-defined threshold, the used n_beam_x is also included in the measurement report. This information lets BS know the height range of the UE and may improve the scheduling at BS side.

If only reporting of cell measurement is configured (i.e., without the reporting of beam measurement), the used n_beam_x is also included in the measurement report. This information lets BS know the height range of the UE and may improve the scheduling at BS side.

FIG. 2 shows an example of a method 200 for wireless communication. At 210, in some embodiments of the disclosed technology, the method includes transmitting, from a network node to a user device, a block of system information that includes system information that is time varying due to at least one of movement of the network node or movement of the user device.

FIG. 3 shows another example of a method 300 for wireless communication. At 310, in some embodiments of the disclosed technology, the method includes determining, at a user equipment based on a height of the user equipment, a number of beams to average, wherein when the height is less than a first height a first number of beams are averaged, wherein when the height is greater than or equal to the first height and less than a second height a second number of beams are averaged, and wherein when the height is greater than or equal to a second height a third number of beams are averaged.

Figure 4:
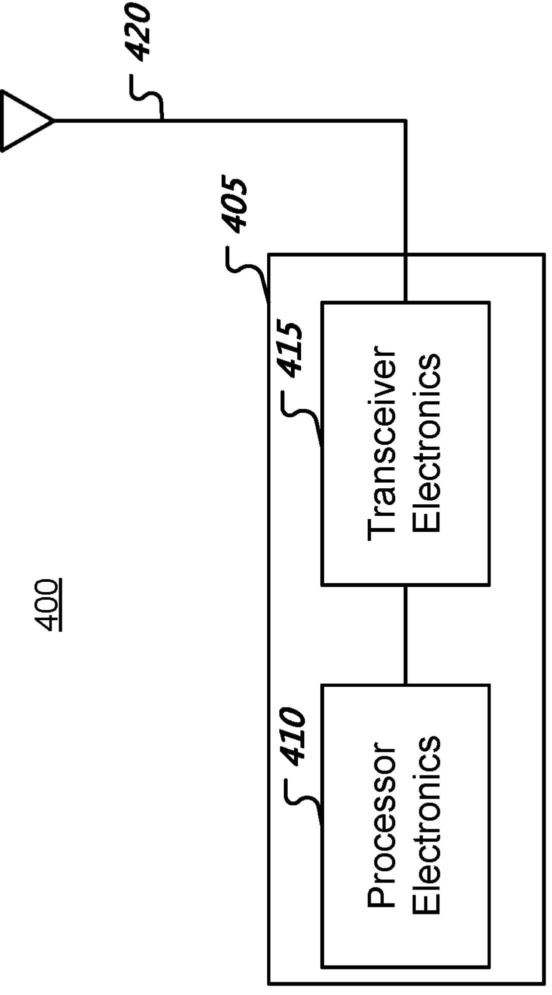
FIG. 4 is a block diagram representation of a portion of a radio station in which one or more embodiments of the present technology can be applied.

FIG. 4 is a block diagram representation of a portion of a radio station in accordance with one or more embodiments of the present technology can be applied. A radio 405 such as a base station or a wireless device (or UE) can include electronics 410 such as a microprocessor that implements one or more of the wireless techniques presented in this document. The radio 405 can include transceiver electronics 415 to send and/or receive wireless signals over one or more communication interfaces such as antenna 420. The radio 405 can include other communication interfaces for transmitting and receiving data. Radio 405 can include one or more memories (not explicitly shown) configured to store information such as data and/or instructions. In some implementations, the processor electronics 410 can include at least a portion of the transceiver electronics 415. In some embodiments, at least some of the disclosed techniques, modules or functions are implemented using the radio 405. In some embodiments, the radio 405 may be configured to perform the methods described in this document.

Some embodiments may preferably implement one or more of the following solutions, listed in clause-format. The following clauses are supported and further described in the Examples above and throughout this document. As used in the clauses below and in the claims, a wireless terminal may be user equipment, mobile station, or any other wireless terminal including fixed nodes such as base stations. A network node includes a base station including a next generation Node B (gNB), enhanced Node B (eNB), or any other device that performs as a base station. A resource range may refer to a range of time-frequency resources or blocks.

SUMMARY

A. In NTN scenarios, new highly time-variant SIs are needed to be indicated to UEs, which include:

(1) The position/velocity/time (PVT) of the BS (2) The scheduling delay (k_offset)

(3) The common TA (TA_common)

(4) The timing drifting rate (R_drift)

B. The new SI can be carried in a new SIBx, which is modified with appropriate modification period (generally shorter than that of the existing SIs). The indication of the SI change can be carried out by:

(1) The new SIBx can be configured with a pre-defined modification period.

(2) The new SIBx can use the same modification period of existing SIs, with corresponding valueTag indication added in SIB1.

(3) The new SIBx can be modified aperiodically with corresponding indication in Short Message with corresponding new bit (or bits) indication.

C. Since PVT is highly related to the moving speed and trajectory of the air-borne BS, its modification period can be pre-defined according to orbit height range or moving speed range.

D. The cell measurement configuration based on best beam or multiple beams is adaptively configured corresponding to the height range of UE in the scenarios of supporting airborne vehicles with grounded BS.

The technical solutions described by the following clauses may be preferably implemented by some embodiments. In the technical solutions described herein in clause format, the network node may be a network device or a network-side equipment such as a base station. A user device may be a user equipment, mobile station, or other wireless device. FIG. 4 shows an example hardware platform for implementing the network node or a wireless node.

Clause 1. A method of wireless communication, comprising: transmitting, from a network node to a user device, a block of system information that includes system information that is time varying due to at least one of movement of the network node or movement of the user device.

Clause 2. The method of clause 1, wherein the network node is a non-terrestrial base station, and the user device is an aircraft-based UE.

Clause 3. The method of any of clauses 1-2, wherein the system information includes a position-velocity-time (PVT) information indicative a position of the base station, a velocity of the base station and a time at the base station.

Clause 4. The method of any of clauses 1-3, wherein the system information includes a scheduling delay value.

Clause 5. The method of any of clauses 1-4, wherein the system information includes a timing advance value.

Clause 6. The method of any of clauses 1-5, wherein the system information includes a timing drift value.

Clause 7. The method of any of clauses 1-6, wherein the block of system information comprises a system information block (SIB).

Clause 8. The method of wireless communication of clause 7, wherein the system information block is updated over time according to: a predefined period based on an orbit height range; or a predefined period based on a speed range of the non-terrestrial base station.

Clause 9. The method of wireless communication of clause 7, wherein a modification period of the system information block is pre-defined according to an orbit height range of the non-terrestrial base station or a moving speed range of the non-terrestrial base station.

Clause 10. The method of wireless communication of clause 7, wherein the system information block is updated over time according to a valueTag indication added to first system information block (SIB1).

Clause 11. The method of wireless communication of clause 7, wherein the system information block is updated over time aperiodically with a corresponding indication in a short message with a bit indication.

Clause 12. A method of reconfiguring a cell measurement quantity, comprising: determining, at a wireless device based on a height of the user device, a number of beams to average, wherein when the height is less than a first height a first number of beams are averaged, wherein when the height is greater than or equal to the first height and less than a second height a second number of beams are averaged, and wherein when the height is greater than or equal to a second height a third number of beams are averaged.

Clause 13. The method of clause 13, wherein the number of beams to average is included in a beam measurement report from the user device to a network node.

Clause 14. The method of wireless communication of any of clauses 1-13, wherein the base station is a satellite or aircraft.

Clause 15. An apparatus configured to perform any of clauses 1 to 14.

Clause 16. A computer-readable medium including instructions that when executed perform any of clauses 1 to 14.

It will be appreciated that the present document discloses techniques that can be embodied in various embodiments to establish and manage wireless network including airborne network connectivity. The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

What is claimed is:

1. A method of wireless communication, comprising:

transmitting, from a network node to a user device, a block of system information that includes system information that is time varying due to movement of the network node;

wherein the block of system information comprises a system information block (SIB);

wherein the SIB is updated over time according to:

a predefined period based on an orbit height range, or a predefined period based on a speed range of the network node.

2. The method of claim 1, wherein the system information includes a position-velocity-time (PVT) information indicative a position of the network node, a velocity of the network node and a time at the network node.

3. The method of claim 1, wherein the system information includes a scheduling delay value.

4. The method of claim 1, wherein the system information includes a timing advance value.

5. The method of claim 1, wherein the system information includes a timing drift value.

6. The method of wireless communication of claim 1, wherein the system information block is updated over time aperiodically with a corresponding indication in a short message with a bit indication.

7. A network node, comprising one or more processors configured cause the network node to:

transmit, to a user device, a block of system information that includes system information that is time varying due to movement of the network node;

wherein the block of system information comprises a system information block (SIB);

wherein the SIB is updated over time according to:

a predefined period based on an orbit height range, or a predefined period based on a speed range of the network node.

8. The network node of claim 7, wherein the system information includes a position-velocity-time (PVT) information indicative a position of the network node, a velocity of the network node and a time at the network node.

9. The network node of claim 7, wherein the system information includes a scheduling delay value.

10. The network node of claim 7, wherein the system information includes a timing advance value.

11. The network node of claim 7, wherein the system information includes a timing drift value.

12. The network node of claim 7, wherein the system information block is updated over time aperiodically with a corresponding indication in a short message with a bit indication.

* * * * *